(12) United States Patent
Smith et al.

(10) Patent No.: US 11,905,651 B2
(45) Date of Patent: Feb. 20, 2024

(54) AUXETIC FABRIC REINFORCED ELASTOMERS

(71) Applicant: SWIFT TEXTILE METALIZING LLC, Bloomfield, CT (US)

(72) Inventors: Alexander T. Smith, Knoxville, TN (US); Jared D G Butlin, Longmeadow, MA (US)

(73) Assignee: Swift Textile Metalizing LLC, Bloomfield, CT (US)

( * ) Notice: Subject to any disclaimer, the term of this patent is extended or adjusted under 35 U.S.C. 154(b) by 94 days.

(21) Appl. No.: 17/349,762

(22) Filed: Jun. 16, 2021

(65) Prior Publication Data

US 2022/0009199 A1 Jan. 13, 2022

Related U.S. Application Data

(60) Provisional application No. 63/040,601, filed on Jun. 18, 2020.

(51) Int. Cl.
*B32B 7/022* (2019.01)
*D06N 3/00* (2006.01)
(Continued)

(52) U.S. Cl.
CPC ........... *D06N 3/0009* (2013.01); *B32B 5/026* (2013.01); *B32B 7/022* (2019.01); *B32B 7/025* (2019.01); *B32B 7/12* (2013.01); *B32B 27/12* (2013.01); *B32B 27/20* (2013.01); *D06M 11/83* (2013.01); *D06N 3/0063* (2013.01); *D06N 3/0077* (2013.01); *B32B 2255/02* (2013.01); *B32B 2255/26* (2013.01); *B32B 2262/02* (2013.01); *B32B 2307/202* (2013.01);
(Continued)

(58) Field of Classification Search
CPC ........... D06N 3/0009; D06N 2209/041; D06N 2209/045; D06N 3/0063; D06N 3/007; B32B 7/022; B32B 7/025; B32B 7/12; B32B 5/026; B32B 27/12; B32B 27/20; D06M 11/83; Y10T 442/2008
USPC ................................ 428/317.3, 343; 442/60
See application file for complete search history.

(56) References Cited

U.S. PATENT DOCUMENTS 6,878,320 B1 4/2005 Alderson et al.
8,652,602 B1 2/2014 Dolla
(Continued)

FOREIGN PATENT DOCUMENTS

CN 108642640 A 10/2018
CN 210706347 U 6/2020
(Continued)

OTHER PUBLICATIONS

Xu, Wanli et al., "Preparation of soft composite reinforced with auxetic warp-knitted spacer fabric for stab resistance," Textile Research Journal, Aug. 1, 2019, p. 1-10, vol. 90, Issue 3-4, China.
Duncan, Olly et al., "Review of Auxetic Materials for Sports Applications: Expanding Options in Comfort and Protection," Appl. Sci. 2018, p. 1-33, 8(6), 941; https://doi.org/10.3390/app8060941, UK.
(Continued)

*Primary Examiner* — Matthew D Matzek
(74) *Attorney, Agent, or Firm* — Baker & McKenzie LLP

(57) ABSTRACT

A composite structure is provided that includes a polymer layer and an auxetic material layer disposed within or partially within the polymer layer. The auxetic material layer provides increased conductivity and elastomeric reinforcement to the polymer layer.

30 Claims, 6 Drawing Sheets

(51) Int. Cl.
  B32B 5/02      (2006.01)
  B32B 27/20     (2006.01)
  B32B 7/025     (2019.01)
  B32B 27/12     (2006.01)
  B32B 7/12      (2006.01)
  D06M 11/83     (2006.01)

(52) U.S. Cl.
  CPC ... *B32B 2307/212* (2013.01); *B32B 2307/706* (2013.01); *D06N 2209/041* (2013.01); *D06N 2209/045* (2013.01); *Y10T 442/2008* (2015.04)

(56) References Cited

U.S. PATENT DOCUMENTS

| | | | |
|---|---|---|---|
| 8,772,187 B2 | 7/2014 | Fan et al. | |
| 8,967,147 B2 | 3/2015 | Martin | |
| 9,048,761 B1 | 6/2015 | Roberts et al. | |
| 9,629,397 B2 | 4/2017 | Toronjo | |
| 10,767,032 B2 | 9/2020 | Pasini et al. | |
| 2011/0260115 A1* | 10/2011 | Kim | H01B 1/22 977/773 |
| 2012/0129416 A1 | 5/2012 | Alderson et al. | |
| 2012/0142239 A1* | 6/2012 | Budden | D06M 15/693 428/221 |
| 2017/0215284 A1 | 7/2017 | Ng et al. | |
| 2018/0064205 A1 | 3/2018 | Cross et al. | |
| 2018/0325216 A1 | 11/2018 | Toronjo | |
| 2020/0245710 A1 | 8/2020 | Ding et al. | |
| 2021/0114345 A1 | 4/2021 | Toronjo et al. | |

FOREIGN PATENT DOCUMENTS

| | | | | |
|---|---|---|---|---|
| CN | 111682796 A | * | 9/2020 | |
| EP | 3096368 A1 | * | 11/2016 | ........... D02G 3/32 |
| JP | 5567276 B2 | | 8/2014 | |
| KR | 102088864 B1 | | 3/2020 | |
| WO | 2018101724 A1 | | 6/2018 | |

OTHER PUBLICATIONS

Kwietniewski, Michał et al., "Review of Elastomeric Materials for Application to Composites Reinforced by Auxetics Fabrics," Procedia Structural Integrity, vol. 17, 2019, pp. 154-161.

Hu, Hong et al., "Auxetic textile materials—a review," Journal of Textile Engineering and Fashion Technology, 2017;1(1):1-15. DOI: 10.15406/jteft.2017.01.00002, Hong Kong.

Zhou, Lin et al., "Auxetic composites made of 3D textile structure and polyurethane foam," physica status solidi (b), Mar. 29, 2016, vol. 253, Issue 7, pp. 1331-1341. Retrieved from: https://doi.org/10.1002/pssb.201552768.

Liaqat, M., et al., "The development of novel auxetic woven structure for impact applications," 2017, The Journal of The Textile Institute, 108(7), 1264-1270.

Moroney, C., et al., "The Application of Auxetic Material for Protective Sports Apparel," In Multidisciplinary Digital Publishing Institute Proceedings, Feb. 23, 2018, vol. 2, No. 6, p. 251.

Zhang, G., et al., "Dynamic thermo-mechanical and impact properties of helical auxetic yarns," Composites Part B: Engineering, Jun. 2016, 99, 494-505.

Ugbolue, S.C., et al., "The formation and performance of auxetic textiles. Part I: theoretical and technical considerations," The Journal of the Textile Institute, 2010, 101(7), 660-667.

Krey, J., and K. Friedrich, "Variably flexible aramid fibre composites with elastomeric matrices," Plastics and rubber processing and applications 11.2 (1989): 83-91.

Kuo, Chen-Ming, Kiyohisa Takahashi, and Tsu-Wei Chou, "Effect of fiber waviness on the nonlinear elastic behavior of flexible composites," Journal of Composite Materials 22.11 (1988): 1004-1025.

Luo, Shen-Yi, and Tsu-Wei Chou, "Finite deformation and nonlinear elastic behavior of flexible composites," (1988): 149-155.

Peel, Larry D., and D. W. Jensen, "Fabrication and mechanics of fiber-reinforced elastomers," Diss. Brigham Young University. Department of Mechanical Engineering, 1998.

* cited by examiner

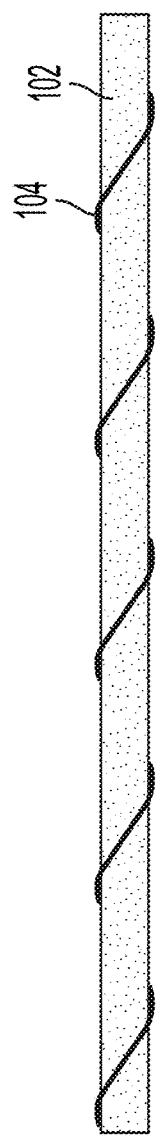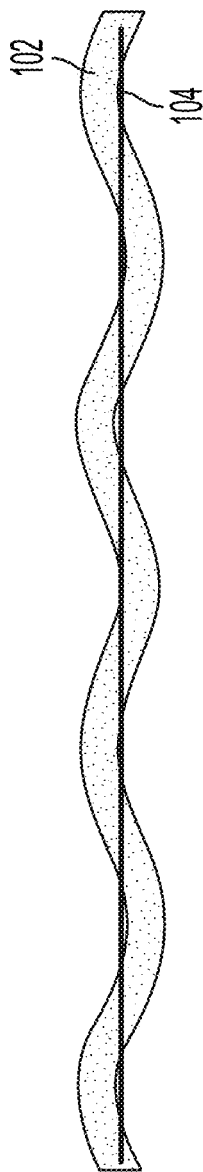

AUXETIC FABRIC REINFORCED ELASTOMERS

CROSS-REFERENCE TO RELATED APPLICATION

This application claims priority to U.S. provisional application No. 63/040,601 filed on Jun. 18, 2020, the contents of which is included herein in its entirety.

GOVERNMENT LICENSE RIGHTS

This invention was made with government support under Contract No. FA864919CA007 awarded by The United States Air Force. The government has certain rights in the invention.

BACKGROUND

Legacy fabric reinforced elastomeric (FRE) composites have shown that use of fabric material can dramatically alter the properties of polymer matrix alone. Broadly speaking, such material can increase the stiffness and yield strength, with the trade-off of reduced elasticity of the resulting composite material.

Typically auxetic materials may include a range of auxetic filaments, foams, yarns, fibers, fabrics, and knits that have been commercially available and are used in many applications such as body armor, sports apparel, and prosthetics. Moreover, the auxetic materials may be formed using a Helical Auxetic Yarn (HAY) where a core filament 102 is wrapped with a thinner fiber 104, as shown in FIG. 1A. In other implementations, HAYs may include the core filament 102 wrapping around the thinner fiber 104, as shown in FIG. 1B. HAYs can easily be made on existing textile machinery such as wrap spinners.

Alternative constructions have been developed using a knit helical 202 wrap around a thin core 204, which can be made using warp knitting machinery, as shown in FIG. 2A-2C.

The present disclosure shows that the use of auxetic fabric reinforcement offers a novel method of tailoring the composite's properties, and can provide benefits of increased yield strength as well as maintaining much of the elasticity imparted from the polymer matrix.

BRIEF SUMMARY

According to one aspect of the subject matter described in this disclosure, a composite structure is provided. The composite includes a polymer layer, and an auxetic material layer disposed within the polymer layer. The auxetic material layer provides increased conductivity and elastomeric reinforcement to the polymer layer.

According to another aspect of the subject matter described in this disclosure, a composite structure is provided. The composite includes a polymer layer and a first portion of an auxetic material layer embedded within the polymer layer. The first portion of the auxetic material layer provides increased conductivity and elastomeric reinforcement to the polymer layer. A second portion of the auxetic layer is positioned external the polymer layer.

According to another aspect of the subject matter described in this disclosure, a method for forming a reinforced composite structure is provided. The method includes providing a polymer layer, and forming an auxetic material layer within or partially within the polymer layer. The auxetic material layer includes an auxetic material being coated with one or more metallized materials.

Additional features and advantages of the present disclosure are described in, and will be apparent from, the detailed description of this disclosure.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

FIG. 1A-B are schematic diagrams illustrating a prior art helical auxetic yarn.

DETAILED DESCRIPTION

Figure 2C:
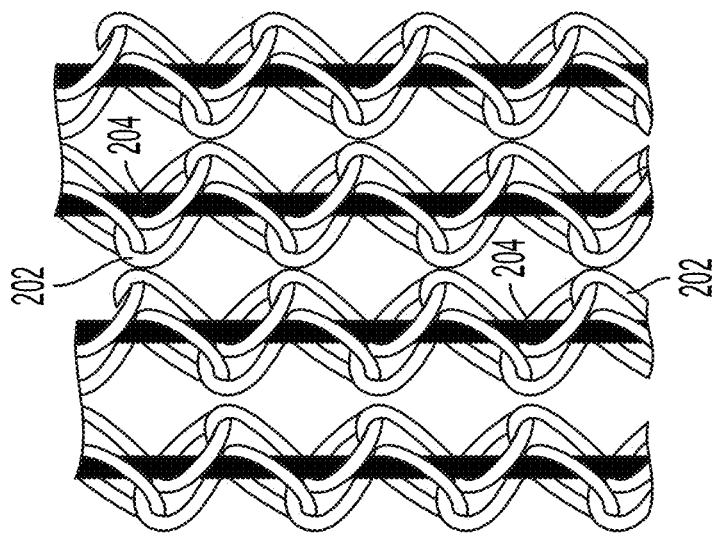
FIG. 2A-C are schematic diagrams illustrating a prior art auxetic knit.
Figure 2B:
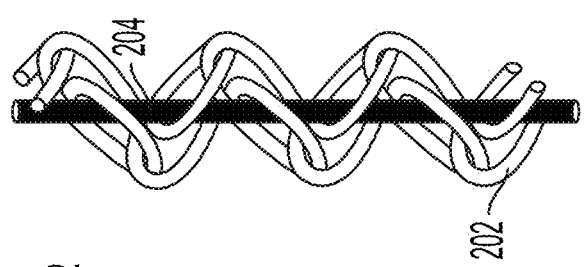
Figure 2A:
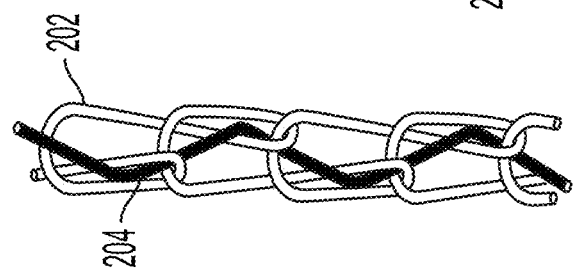

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

This disclosure describes forming composite structure having metallized auxetic materials. The metallized auxetic materials may include a negative Poisson's ratio, whereby a counter intuitive effect is observed. During elongation the material expands perpendicular to the plane of elongation resulting in a compensatory effect for the "necking" phenomenon typically observed at the midpoint of the material. Such materials have also been shown to have higher energy absorption and fracture strengths.

A large range of knit structures can be produced on industry standard warp knitting equipment including fillet knits, square, rectangular, rhomboidal, hexagonal or almost round shape. By modifying variables in the construction of the metallized auxetic fabric, such as number of wraps, diameter of threads, elasticity of components, etc., the Poisson's ratio may be tuned to the specific application without any need for new machinery or capital expenditure.

The mechanical behavior response profiles of fiber-reinforced elastomers (flexible composites) can be significantly different from those of typical advanced "stiff" composites. Composite material such as fiberglass and carbon fiber embedded in various resins such as epoxy, or polyester are common examples of "stiff" composites. Metallized auxetic material-reinforced elastomers may offer the ability to customize physical properties such as stiffness, deformation and nonlinearity over a much broader range than is possible with traditional "stiff" composites. These properties are achieved through selection of elastomer matrix, fiber material, and fiber orientation.

Moreover, the metallized auxetic fabric reinforced elastomers (AFREs) described herein benefit from improved breaking strength while also retaining more of the elastomeric recovery during the initial elongation. The metallized auxetic cells may be able to better match the modulus of the polymer matrix during the polymer uncoiling phase due to the omnidirectional fiber reorientation, thus extending the elastomeric composite's recovery zone. Once the amount of elongation has exceeded the metallized auxetic properties of the underlying fabric the composite enters the deformation phase, and acts more like a traditional composite, exhibiting increased stiffness, toughness and high fracture strength. Moreover, the metallized auxetic materials may change conductivity of the composite structure when introduced to strain or elongation.

Figure 3:
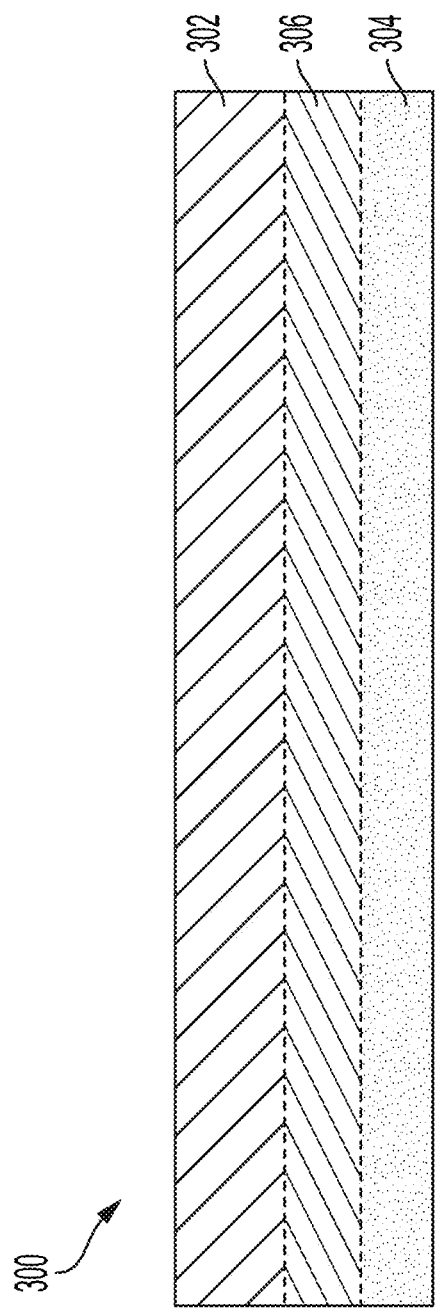
FIG. 3 is a schematic diagram illustrating a composite structure having auxetic materials partially embedded in a polymer, in accordance with some embodiments.

FIG. 3 is a schematic diagram illustrating a composite structure 300 having metallized auxetic materials partially embedded in a polymer, in accordance with some embodiments. The composite structure 300 may include polymer layer 302 and a metallized auxetic material layer 304. The metallized auxetic material layer 304 may include conductive auxetic materials fabrics or fibers. A portion 306 of metallized auxetic material layer 304 may be partially embedded within polymer layer 302. The portion 306 of metallized auxetic material layer 304 provides increased conductivity and elastomeric reinforcement to the polymer layer 302.

In some implementations, the polymer layer 302 may be a polymer matrix. In some embodiments, the polymer matrix may include one or more of the following: a thermoplastic, fluorine moieties, plasticizers co-block polymer segment(s), silicone, room temperature vulcanizing (RTV) silicone, or polyurethane. In some embodiments, the polymer matrix may be pre-cast and the metallized auxetic material layer 304 may be pressed into the polymer matrix. In some embodiments, the metallized auxetic material layer 304 may be pressed into the polymer matrix using heat. In some embodiments, the metallized auxetic material layer 304 may be pressed into the polymer matrix at room temperature. In some embodiments, polymer curing may be completed during the press.

In some embodiments, the polymer matrix may include one or more of the following: reduced graphene oxide, graphene oxide, silver nanowires, metal nanowires, graphite, graphite flakes, graphite flakes coated in a metal, graphite flakes coated in silver, graphite flakes coated in nickel, graphite flakes coated in gold, graphite flakes coated in silver and nickel, graphite flakes coated in silver and gold, graphite flakes coated in copper, graphite flakes coated in copper and nickel, carbonyl iron, carbon nanotubes, conductive materials (example PEDOT), metal particles as a filler, or silver particles as a conductive filler.

In some implementations, the polymer layer may result from addition polymerization or condensation polymerization. In some implementations, polymer layer 302 may be activated by a free-radical. In some embodiments, polymer layer 302 may be thermally cured. In some embodiments, polymer layer 302 may be light activated. In some implementations, pH adjustment or a catalyst may activate polymer layer 302. In some embodiments, polymer layer 302 may use an activating compound incorporated within the polymer network.

In some embodiments, the auxetic material layer 304 may include fabrics being coated with one or more metals, MXene, carbon-based particles, or combinations thereof to achieve conductivity.

In some implementations, the metallized auxetic material layer 304 may include a conductive auxetic fabric formed using a knit construction. In some embodiments, the knitted conductive auxetic fabric may include monofilament and/or multifilament yarns. In some embodiments, the monofilament yarns may include one or more of the following: helical conductive auxetic yarn (HAY) type construction, polyamide, polyester, silicone, polyurethane, or a conductive polymer, or any combination such as but not limited to a combination of polyamide and silicone, a combination of polyester and silicone, polyamide and polyurethane, polyester and polyurethane. In some embodiments, the multifilament yarns may include one or more of the following: helical conductive auxetic yarn (HAY) type construction, polyamide, polyester, silicone, polyurethane, or a conductive polymer, or any combination such as but not limited to a combination of polyamide and silicone, a combination of polyester and silicone, polyamide and polyurethane, polyester and polyurethane. In some embodiments, the knitted conductive auxetic fabric may include one or more of the following: conductive materials, resistive materials, silver, tin, palladium, gold, graphene, graphene oxide, carbon nanotubes, conductive polymers, nanoparticles, nickel, a combination of silver and nickel, copper, a combination of copper and nickel, carbides, metal oxides, MXenes, or a metal.

In some implementations, the metallized auxetic material layer 304 may include a woven conductive auxetic fabric. In some embodiments, the woven conductive auxetic fabric may include monofilament and/or multifilament yarns. In some embodiments, the monofilament yarns may include one or more of the following: helical conductive auxetic yarn (HAY) type construction, polyamide, polyester, silicone, polyurethane, or a conductive polymer, or any combination such as but not limited to a combination of polyamide and silicone, a combination of polyester and silicone, polyamide and polyurethane, polyester and polyurethane. In some embodiments, the multifilament yarns may include one or more of the following: helical conductive auxetic yarn (HAY) type construction, polyamide, polyester, silicone, polyurethane, or a conductive polymer, or any combination such as but not limited to a combination of polyamide and silicone, a combination of polyester and silicone, polyamide and polyurethane, polyester and polyurethane. In some embodiments, the woven conductive auxetic fabric may include one or more of the following: conductive materials, resistive materials, silver, tin, palladium, gold, graphene, graphene oxide, carbon nanotubes, conductive polymers, nanoparticles, nickel, a combination of silver and nickel, copper, a combination of copper and nickel, carbides, metal oxides, MXenes, or a metal.

Figure 4:
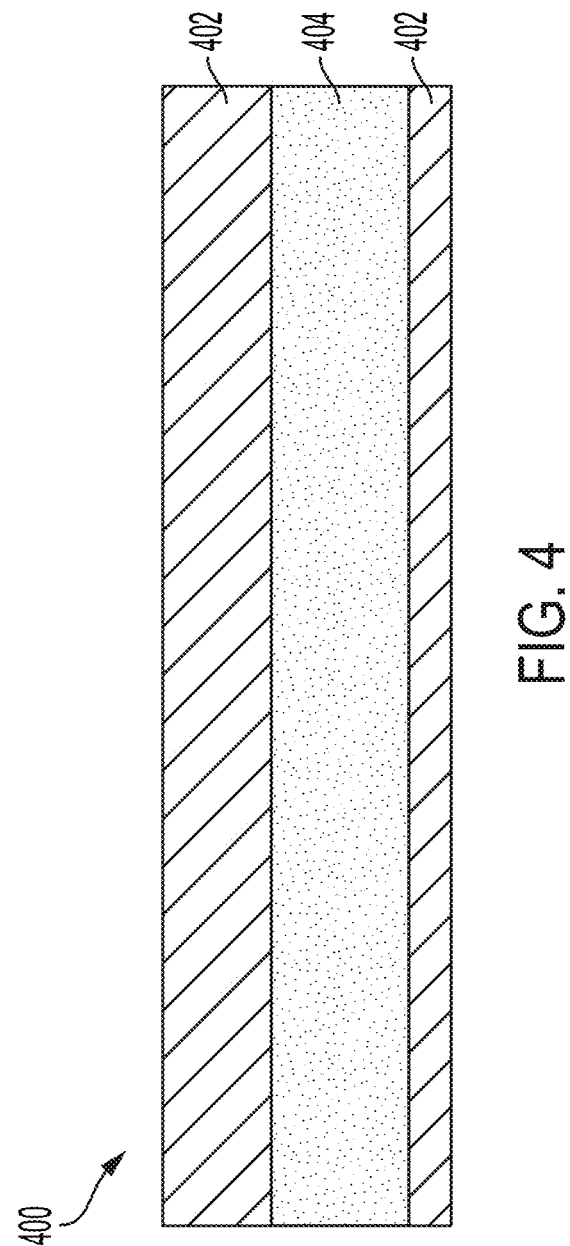
FIG. 4 is a schematic diagram illustrating a composite structure having auxetic materials fully embedded in a polymer, in accordance with some embodiments.

FIG. 4 is a schematic diagram illustrating a composite structure 400 having a metallized auxetic material layer fully embedded in an elastomer, in accordance with some embodiments. The composite structure 400 may include a polymer layer 402 and a metallized auxetic material layer 404. In this instance, metallized auxetic material layer 404 may be fully embedded within polymer layer 402. The metallized auxetic material layer 404 provides increased conductivity and elastomeric reinforcement to the polymer layer.

In some implementations, the polymer layer 402 may be a polymer matrix. In some embodiments, the polymer matrix may include one or more of the following: a thermoplastic, fluorine moieties, plasticizers, co-block polymer segment(s), silicone, or room temperature vulcanizing (RTV) silicone, or polyurethane. In some embodiments, the polymer matrix may be pre-cast and the metallized auxetic material layer 404 may be pressed into the polymer matrix. In some embodiments, the metallized auxetic material layer 404 may be pressed into the polymer matrix using heat. In some embodiments, the metallized auxetic material layer 404 may be pressed into the polymer matrix at room temperature. In some embodiments, polymer curing may be completed during the press.

In some embodiments, the polymer matrix may include one or more of the following: reduced graphene oxide, graphene oxide, silver nanowires, metal nanowires, graphite, graphite flakes, graphite flakes coated in a metal, graphite flakes coated in silver, graphite flakes coated in nickel, graphite flakes coated in gold, graphite flakes coated in silver and nickel, graphite flakes coated in silver and gold, graphite flakes coated in copper, graphite flakes coated in copper and nickel, carbonyl iron, carbon nanotubes, conductive materials (example PEDOT), metal particles as a filler, or silver particles as a conductive filler.

In some implementations, the polymer layer may result from addition polymerization or condensation polymerization. In some implementations, polymer layer 402 may be activated by a free-radical. In some embodiments, polymer layer 402 may be thermally cured. In some embodiments, polymer layer 402 may be light activated. In some implementations, pH adjustment or a catalyst may activate polymer layer 402. In some embodiments, polymer layer 402 may use an activating compound incorporated within the polymer network.

In some embodiments, the metallized auxetic material layer 404 may include fabrics being coated with one or more metals, MXene, carbon-based particles, or combination to achieve conductivity.

In some implementations, the metallized auxetic material layer 404 may include a conductive auxetic fabric formed using a knit construction. In some embodiments, the knitted conductive auxetic fabric may include monofilament and/or multifilament yarns. In some embodiments, the monofilament yarns may include one or more of the following: helical conductive auxetic yarn (HAY) type construction, polyamide, polyester, silicone, polyurethane, or a conductive polymer, or any combination such as but not limited to a combination of polyamide and silicone, a combination of polyester and silicone, polyamide and polyurethane, polyester and polyurethane. In some embodiments, the multifilament yarns may include one or more of the following: helical conductive auxetic yarn (HAY) type construction, polyamide, polyester, silicone, polyurethane, or a conductive polymer, or any combination such as but not limited to a combination of polyamide and silicone, a combination of polyester and silicone, polyamide and polyurethane, polyester and polyurethane. In some embodiments, the knitted conductive auxetic fabric may include one or more of the following: conductive materials, resistive materials, silver, tin, palladium, gold, graphene, graphene oxide, carbon nanotubes, conductive polymers, nanoparticles, nickel, a combination of silver and nickel, copper, a combination of copper and nickel, carbides, metal oxides, MXenes, or a metal.

In some implementations, the metallized auxetic material layer 404 may include a woven conductive auxetic fabric. In some embodiments, the woven conductive auxetic fabric may include monofilament and/or multifilament yarns. In some embodiments, the monofilament yarns may include one or more of the following: helical conductive auxetic yarn (HAY) type construction, polyamide, polyester, silicone, polyurethane, or a conductive polymer, or any combination such as but not limited to a combination of polyamide and silicone, a combination of polyester and silicone, polyamide and polyurethane, polyester and polyurethane. In some embodiments, the multifilament yarns may include one or more of the following: helical conductive auxetic yarn (HAY) type construction, polyamide, polyester, silicone, polyurethane, or a conductive polymer, or any combination such as but not limited to a combination of polyamide and silicone, a combination of polyester and silicone, polyamide and polyurethane, polyester and polyurethane. In some embodiments, the woven conductive auxetic fabric may include one or more of the following: conductive materials, resistive materials, silver, tin, palladium, gold, graphene, graphene oxide, carbon nanotubes, conductive polymers, nanoparticles, nickel, a combination of silver and nickel, copper, a combination of copper and nickel, carbides, metal oxides, MXenes, or a metal.

Figure 5:
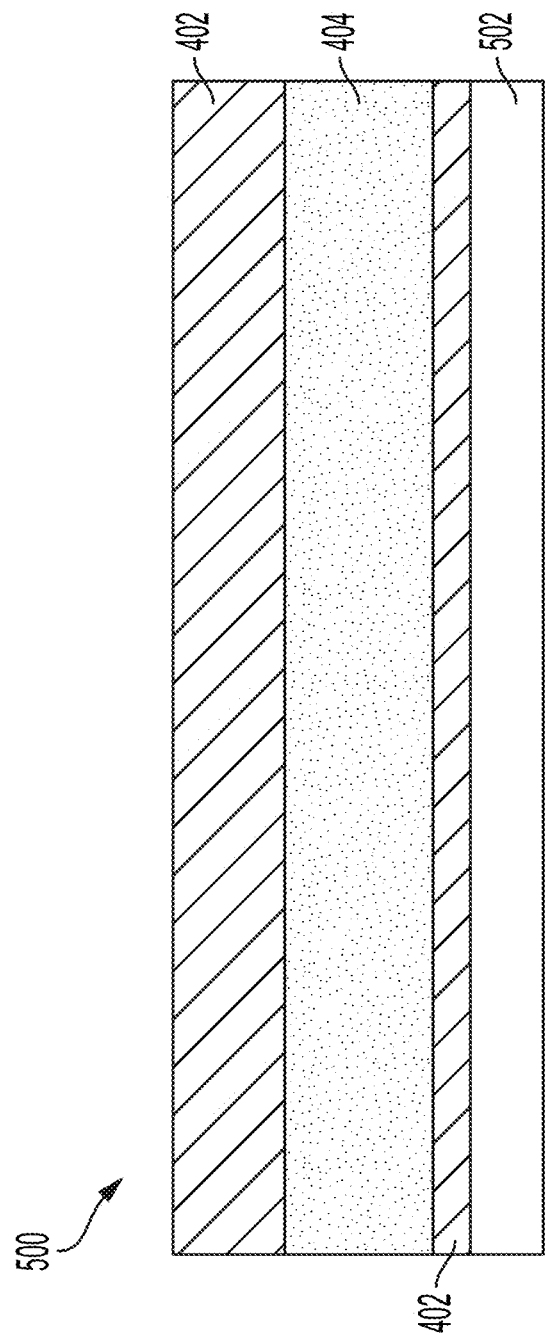
FIG. 5 is a schematic diagram illustrating a composite structure having auxetic fabrics materials fully embedded in a polymer and the composite structure being adjoined to an adhesive, in accordance with some embodiments.

FIG. 5 is a schematic diagram illustrating a composite structure 500 having a metallized auxetic material layer fully embedded in a polymer and being adjoined to an adhesive, in accordance with some embodiments. The composite structure 500 is similar to composite 400, except composite structure 500 may include adhesive layer 502 positioned on the polymer layer 402.

In some implementations, the adhesive layer 502 may be a pressure sensitive adhesive, a room temperature vulcanizing (RTV) adhesive composite, or a contact adhesive. In some embodiments, the adhesive layer 502 may be light activated, partially cured, resistive, or conductive. In some embodiments, the adhesive layer 602 may include one or more of the following: a conductive polymer, a conductive filler, silver, nanoparticles, nickel, a combination of silver and nickel, a metal, reduced graphene oxide, graphene oxide, silver nanowires, metal nanowires, graphite, graphite flakes, graphite flakes coated in a metal, graphite flakes coated in silver, graphite flakes coated in nickel, graphite flakes coated in gold, graphite flakes coated in silver and nickel, graphite flakes coated in silver and gold, graphite flakes coated in copper and nickel, graphite flakes coated in copper, carbonyl iron, or carbon nanotubes.

Figure 6:
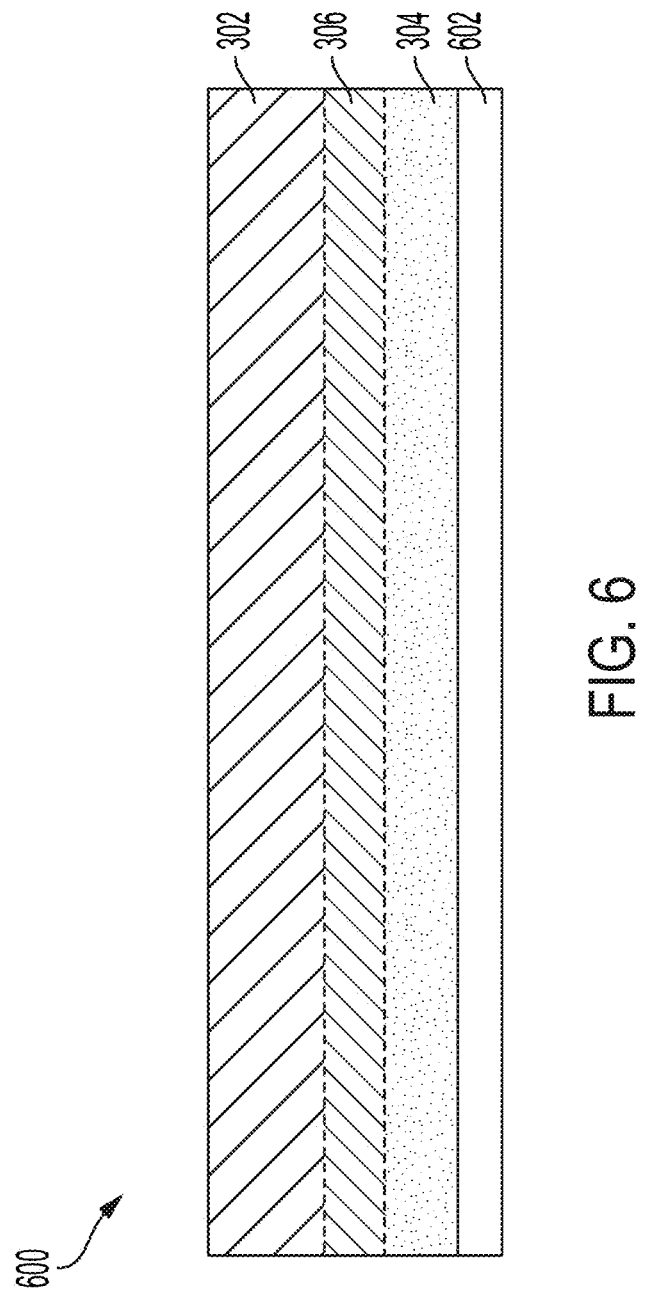
FIG. 6 is a schematic diagram illustrating a composite structure having auxetic materials partially embedded in a polymer, and the composite structure being adjoined by an adhesive, in accordance with some embodiments.

FIG. 6 is a schematic diagram illustrating a composite structure 600 having a metallized auxetic material layer partially embedded in a polymer, and being adjoined by an adhesive, in accordance with some embodiments. The composite structure 600 is similar to composite 300, except composite structure 600 may include adhesive layer 602 positioned on a portion of the metallized auxetic material layer 304 not embedded in polymer layer 302.

In some implementations, the adhesive layer 602 may be a pressure sensitive adhesive, an RTV adhesive composite, or a contact adhesive. In some embodiments, the adhesive layer 602 may be light activated, partially cured, resistive, or conductive. In some embodiments, the adhesive layer 602 may include one or more of the following: a conductive polymer, a conductive filler, silver, nanoparticles, nickel, a combination of silver and nickel, a metal, reduced graphene oxide, graphene oxide, silver nanowires, metal nanowires, carbon-based particle, graphite, graphite flakes, graphite flakes coated in a metal, graphite flakes coated in silver, graphite flakes coated in nickel, graphite flakes coated in gold, graphite flakes coated in silver and nickel, graphite flakes coated in silver and gold, graphite flakes coated in copper and nickel, graphite flakes coated in copper, carbonyl iron, or carbon nanotubes. In some embodiments, the carbon-based particles may include but not limited to graphene, graphite, carbon nanotubes, carbon buckyballs, diamond nanoparticles, or the like.

In some embodiments, the metallized auxetic material layers 304 and 404 may include materials having conductive and/or magnetic properties. In some embodiments, the polymer layers 302 and 402 may be magnetically loaded matrixes. In some embodiments, the metallized auxetic materials layer 304 and 404 may include fabrics that have been coated with one or more metals, MXene, carbon-based particles, or combinations thereof to achieve conductivity.

The use of metallized auxetic fabrics and fibers in the composite as disclosed herein adds an additional mechanism for tailoring the properties of the composite material. Their ability to influence the mechanical properties of the material stem from the following. Firstly, the mechanism in which the metallized fibers respond to elongation may result in an omnidirectional expansion of the cells, rather than elongation along the strain axis as is typically observed. This may allow the metallized fabric to move with the polymer matrix and aids in maintaining the overall shape of the composite, thus minimizing the necking phenomenon typically observed during elongation. Also, internal stresses typically observed may be minimized when off-axis metallized fibers must reorient themselves during strain. Moreover, the metallized auxetic materials may change the conductivity of the composite when introduced to strain or elongation.

Secondly, the construction of the metallized auxetic materials, such as conductive fabrics or fibers, may result in a more elastic reinforcement material with excellent recovery properties. This may allow for a better match of moduli between the polymer matrix and metallized auxetic materials. Large differences in stiffness between the metallized auxetic materials and matrix dramatically influence the deformation of FRE laminates. Typical "stiff" composites have reinforcements with an axial Young's modulus on the order of 70 to 400 GPa, whereas the polymer matrix moduli are on the order of 3.5 GPa.

According to the principles of the present disclosure, composite structures may be formed to exhibit both electromagnetic properties and elastomeric reinforcement without requiring significant processing and costs. Moreover, the composite structures may be sized to operate in various electromagnetic regions, such as the microwave region, without requiring significant changes in processing. The composite structures having metallized auxetic materials described herein may be used in electromagnetic shielding applications for use in airplanes or homes. Moreover, the composite structures described herein may be used in microwave absorption applications.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A composite structure comprising:
   a polymer layer;
   an auxetic material layer disposed within the polymer layer, wherein the auxetic material layer provides increased electrical conductivity and elastomeric reinforcement to the polymer layer; and
   an adhesive disposed on the polymer layer,
   wherein the adhesive comprises one or more of the following: a conductive polymer, nickel, reduced graphene oxide, graphene oxide, nanowires, metal nanowires, carbon-based particles, graphite, graphite flakes, graphite flakes coated in a metal, graphite flakes coated in nickel, graphite flakes coated in gold, graphite flakes coated in copper and nickel, graphite flakes coated in copper, and carbonyl iron.

2. The composite structure of claim 1, wherein the polymer layer is a polymer matrix.

3. The composite structure of claim 2, wherein the polymer matrix comprises one or more of the following: reduced graphene oxide, graphene oxide, silver nanowires, metal nanowires, graphite, graphite flakes, graphite flakes coated in a metal, graphite flakes coated in silver, graphite flakes coated in nickel, graphite flakes coated in gold, graphite flakes coated in silver and nickel, graphite flakes coated in silver and gold, graphite flakes coated in copper, graphite flakes coated in copper and nickel, carbonyl iron, carbon nanotubes, conductive materials, metal particles as a filler, or silver particles as a conductive filler.

4. The composite structure of claim 1, wherein the polymer layer results from addition polymerization or condensation polymerization and may be activated by a free-radical, thermally cured, pH adjustment, a catalyst, or light.

5. The composite structure of claim 1, wherein the polymer matrix comprises one or more of a thermoplastic, a fluorine moiety, a plasticizer, a co-block polymer segment, a silicone, a room temperature vulcanizing silicone, and a polyurethane.

6. The composite structure of claim 1, wherein the auxetic material layer comprises fabrics being coated with one or more metals, MXene, carbon-based particles, or combinations thereof to achieve conductivity.

7. The composite structure of claim 1, wherein the auxetic material layer comprises an auxetic fabric formed using a knit construction.

8. The composite structure of claim 7, wherein the knitted auxetic fabric comprises monofilament and/or multifilament yarns.

9. The composite structure of claim 8, wherein the monofilament yarns comprise one or more of the following: helical conductive auxetic yarn (HAY) type construction, polyamide, polyester, silicone, polyurethane, a conductive polymer, a combination of polyamide and silicone, a combination of polyester and silicone, a combination of polyamide and polyurethane, a combination of polyester and polyurethane.

10. The composite structure of claim 8, wherein the multifilament yarns comprise one or more of the following: helical conductive auxetic yarn (HAY) type construction, polyamide, polyester, silicone, polyurethane, a conductive polymer, a combination of polyamide and silicone, a combination of polyester and silicone, a combination of polyamide and polyurethane, a combination of polyester and polyurethane.

11. The composite structure of claim 7, wherein the knitted auxetic fabric comprises one or more of the following: conductive materials, resistive materials, silver, tin, palladium, gold, graphene, graphene oxide, carbon nanotubes, conductive polymers, nanoparticles, nickel, a combination of silver and nickel, copper, a combination of copper and nickel, carbides, metal oxides, MXenes, or a metal.

12. The composite structure of claim 1, wherein the adhesive is a pressure sensitive adhesive, a room temperature vulcanizing (RTV) composite, light activated, partially cured, heat cured, moisture cured, or a contact adhesive.

13. The composite structure of claim 1, wherein the adhesive is resistive or conductive.

14. The composite structure of claim 1, wherein the composite structure is used in radio frequency (RF) shielding applications or RF absorption applications.

15. The composite structure of claim 1, wherein the auxetic material layer changes conductivity of the composite structure when introduced to strain or elongation.

16. A composite structure comprising:
a polymer layer;
a first portion of an auxetic material layer embedded within the polymer layer, wherein the first portion of the auxetic material layer provides increased electrical conductivity and elastomeric reinforcement to the polymer layer;
a second portion of the layer positioned external the polymer layer; and
an adhesive disposed on the second portion of the auxetic layer,
wherein the adhesive comprises one or more of the following: a conductive polymer, nickel, reduced graphene oxide, graphene oxide, nanowires, metal nanowires, carbon-based particles, graphite, graphite flakes, graphite flakes coated in a metal, graphite flakes coated in nickel, graphite flakes coated in gold, graphite flakes coated in copper and nickel, graphite flakes coated in copper, and carbonyl iron.

17. The composite structure of claim 16, wherein the adhesive is a pressure sensitive adhesive, a room temperature vulcanizing (RTV) composite, light activated, partially cured, heat cured, moisture cured, or a contact adhesive.

18. The composite structure of claim 16, wherein the adhesive is resistive or conductive.

19. The composite structure of claim 16, wherein the polymer layer comprises a polymer matrix having one or more of the following: reduced graphene oxide, graphene oxide, silver nanowires, metal nanowires, graphite, graphite flakes, graphite flakes coated in a metal, graphite flakes coated in silver, graphite flakes coated in nickel, graphite flakes coated in gold, graphite flakes coated in silver and nickel, graphite flakes coated in silver and gold, graphite flakes coated in copper, graphite flakes coated in copper and nickel, carbonyl iron, carbon nanotubes, conductive materials, metal particles as a filler, or silver particles as a conductive filler.

20. The composite structure of claim 16, wherein the polymer layer results from addition polymerization or condensation polymerization and may be activated by a free-radical, thermally cured, pH adjustment, a catalyst, or light.

21. The composite structure of claim 19, wherein the polymer matrix comprises one or more of a thermoplastic, a fluorine moiety, a plasticizer, a co-block polymer segment, a silicone, a room temperature vulcanizing silicone, and a polyurethane.

22. The composite structure of claim 16, wherein the auxetic material layer comprises a fabric coated with one or more metals, MXene, carbon-based particles, or combinations thereof to achieve conductivity.

23. The composite structure of claim 16, wherein the auxetic material layer comprises a conductive auxetic fabric formed using a knit or woven construction.

24. The composite structure of claim 23, wherein the knitted or woven conductive auxetic fabric comprises monofilament and/or multifilament yarns.

25. The composite structure of claim 24, wherein the monofilament yarns comprise one or more of the following: helical conductive auxetic yarn (HAY) type construction, polyamide, polyester, silicone, polyurethane, a conductive polymer, a combination of polyamide and silicone, a combination of polyester and silicone, a combination of polyamide and polyurethane, a combination of polyester and polyurethane.

26. The composite structure of claim 24, wherein the multifilament yarns comprise one or more of the following: helical conductive auxetic yarn (HAY) type construction, polyamide, polyester, silicone, polyurethane, a conductive polymer, a combination of polyamide and silicone, a combination of polyester and silicone, a combination of polyamide and polyurethane, a combination of polyester and polyurethane.

27. The composite structure of claim 23, wherein the knitted or woven conductive auxetic fabric comprises conductive materials, resistive materials, silver, tin, palladium, gold, graphene, graphene oxide, carbon nanotubes, conductive polymers, nanoparticles, nickel, a combination of silver and nickel, copper, a combination of copper and nickel, carbides, metal oxides, MXenes, or a metal.

28. The composite structure of claim 16, wherein the composite structure is used in radio frequency (RF) shielding applications or RF absorption applications.

29. The composite structure of claim 16, wherein the auxetic material layer changes conductivity of the composite structure when introduced to strain or elongation.

30. A method for forming a reinforced composite structure comprising:
  providing a polymer layer;
  forming an auxetic material layer within or partially within the polymer layer, wherein the auxetic material layer comprises an auxetic material being coated with one or more conductive materials; and
  forming an adhesive disposed on the polymer layer,
  wherein the adhesive comprises one or more of the following: a conductive polymer, nickel, reduced graphene oxide, graphene oxide, nanowires, metal nanowires, carbon-based particles, graphite, graphite flakes, graphite flakes coated in a metal, graphite flakes coated in nickel, graphite flakes coated in gold, graphite flakes coated in copper and nickel, graphite flakes coated in copper, and carbonyl iron.

* * * * *